June 13, 1967  D. SATAS  3,325,322

METHOD OF PRODUCING BREATHABLE STRUCTURES

Filed Sept. 9, 1965  2 Sheets-Sheet 1

INVENTOR.
Donatus Satas
BY James J. Fawcett
Atty.

3,325,322
METHOD OF PRODUCING BREATHABLE STRUCTURES
Donatas Satas, Palatine, Ill., assignor to The Kendall Company, Boston, Mass., a corporation of Massachusetts
Filed Sept. 9, 1965, Ser. No. 486,119
8 Claims. (Cl. 156—62.2)

This application is a continuation-in-part of my copending applications entitled Breathable Structures, Ser. No. 31,182 filed May 23, 1960, now patent 3,232,819 and Sprayed Elastic Fabric, Ser. No. 193,220 filed May 8, 1962, now abandoned.

This invention is concerned with the pneumatic spray process of making porous air permeable concretions of synthetic polymers and laminations thereof. More particularly, this invention is concerned with the method of making sprayed unvulcanized and vulcanized or cross-linked air permeable structures composed of built-up deposits from sprays of normally solid polymers preferably of polyurethane rubber or of plasticized vinyl resin blended with nitrile rubber either alone or laminated to other materials.

For purposes of this invention the term "normally solid polymer" is a polymer which, after it reaches the gel stage and until and while it is completely dried from solution, will not flow sufficiently to close pores therein either at ambient temperatures or at the lowest practical temperatures for solvent drying.

Heretofore plastic materials have been formed by pneumatic spray methods into porous fibrous reticulate open webs in accordance with the teachings of Canadian Patent No. 570,011 or U.S. Patent No. 2,810,426 but such materials, produced by different methods than those of this invention, have little resemblance to natural leather or to the structures made in accordance with this invention either in appearance or properties. The products made by the process of this invention, however, not only may be made to resemble leather in properties but the physical appearance may closely resemble both the grain and flesh sides of leather. In addition, the products made by the process of this invention when applied to the flesh side of thin leather form permanent composites having desirable qualities of thicker more valuable leather. In a like manner, the products made by the process of this invention may be applied to equalize the thickness of leather in various portions thereof.

In addition, other products produced by the invention which do not resemble leather so closely, have structures and properties in combination never before attained with similar materials either by the subject patented methods or others. The hand of such products made by the process of the invention is particularly unusual for polymeric materials produced by non-textile methods, being supple and clothlike to the touch and wholly unlike cast porous films and foams. In addition, such products have porosities which are unusually high considering their relative densities, excellent tensile strengths and abrasion resistances. For the first time structures made by the process of this invention make available sprayed garments suitable for wear next to the skin such as bathing suits, girdles, athletic supporters, stockings, angle supports, knee guards and the like, garments in which strength and abrasion resistance are coupled with elasticity, air permeability, clothlike feed and seamless construction.

It is an object of this invention to provide a method of producing in various forms, sprayed air permeable structures resembling leather and other structures including garments using normally solid polymers preferably including vinyl resins or polyurethane rubbers which structures have a combination of hand, air permeability, tensile strength and face abrasion resistance never achieved before with the given materials. It is also an object of this invention to provide a method for producing such structures reinforced or laminated with strengthening fibers or with knitted, woven or nonwoven fabrics, mats, nets, and the like.

It is a further object of this invention to provide a method for producing composites of thin leather and air permeable synthetic sprayed structures which composites possess the desirable properties of thicker leather.

Other objects of the invention will be apparent from an inspection of the drawings and their descriptions and from the specification as a whole.

The objects of this invention may be obtained only by the careful selection of ingredients and their relative amounts and the observance of conditions as hereinafter set forth. A nitrile rubber and vinyl resin blend (preferably containing plasticizer, vulcanizing agents, pigments, fillers, accelerators, antioxidants, and the like) is the preferred basic material from which products, particularly leatherlike products, are made by the process of this invention. This blend is dissolved in a mixture of relatively low boiling solvent and a critical range of relatively high boiling solvent. Other preferred basic materials especially for use for elastic garments, particularly for those which are to be worn next to the skin, are the poly (ester-urethane) elastomers.

Figures 1, 2, 2A, 3, 4:
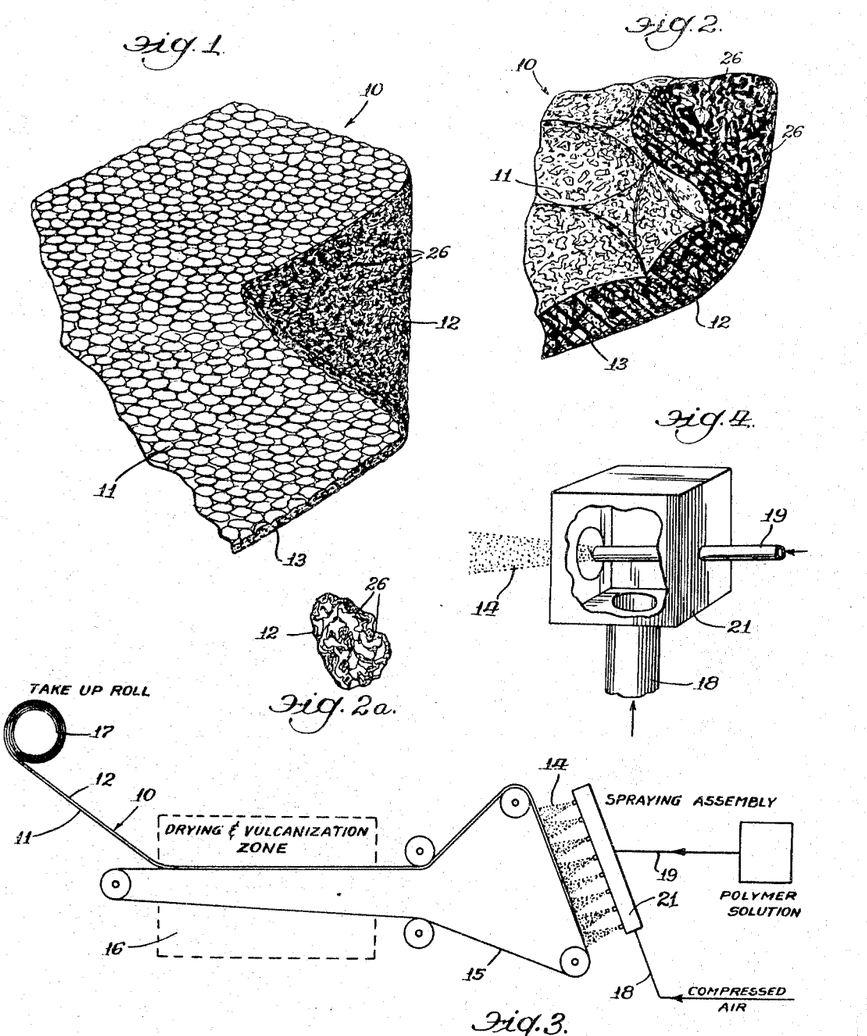
FIG. 1 is an isometric view of a typical embossed unsupported sheet made by the process of this invention as it appears with an impact molded face side and with a turned-up corner revealing its back side.
FIG. 2 is an enlargement of a portion of FIG. 1 showing in greater detail the face and back structure and the cross-section.
FIG. 2a is an enlargement showing in detail a portion of the back surface of a typical sheet made by the process of the invention.
FIG. 3 is a diagrammatic view of one type of apparatus used in the process of this invention.
FIG. 4 shows a typical nozzle arrangement for spraying.

Referring once more to the drawings, FIG. 1 illustrates the general appearance and FIGS. 2 and 2a illustrate the enlarged appearance of an unsupported sheet 10 of air permeable synthetic normally solid polymeric material produced in accordance with the invention by pneumatically spraying a proper solution under proper conditions against a target forming surface. The face side 11 is shown with an embossed surface formed of coalesced nodules and filamentary strands of fibers of the polymer, which have been impact molded and deformed into minute conformability with the forming surface while the particles were in a softened condition due to the joint effect of plasticizer and retained solvent. The back surface 12 shows the more coarsely porous lacelike matrix of coalesced filamentous strands and nodules 26, which results as thickness is added to the sheet by further spraying. The cut edge 13 is also shown.

In FIG. 3 a typical method of the invention is shown diagrammatically. A series of sprayer heads 21 is shown mounted on an incline one above the other in the spraying assembly. A typical sprayer head is shown in detail in FIG. 4. The polymer solution enters the head by the orifice pipe 19 while the compressed air or inert gas enters by the pipe 18. The polymer solution flows or is pumped out into the turbulent high pressure gas, as the latter leaves the sprayer head and is broken up into a spray 14. The spray droplets, traveling a critical distance of from 10 to 30 inches, are extenuated into filamentary strands in which shape they are forcibly impinged upon the forming surface 15. The latter is arranged in the form of an endless belt moving past the spraying assembly and through the drying and vulcanization zone 16. In practice, of course, the belt and vulcanization zone should be of sufficient length to permit continuous vulcanization at spraying speeds. The finished sheet 10 is separated from the belt and wound on the take-up roll 17. When the sheet is not to be vulcanized, the drying zone may be operated at a very much reduced temperature. When composites are to be made, the apparatus may be modified to carry out the procedure hereinafter set forth for obtaining such composites.

Figure 5:
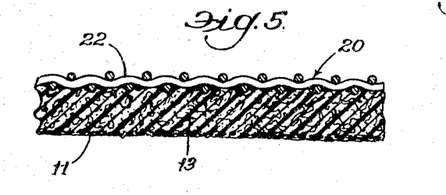
FIG. 5 shows a cross-sectional view of a sheet, made by the process of this invention, including a reinforcing back sheet.

In FIG. 5, a composite 20 is shown in which the back surface of the sheet of FIG. 1 has adhered to it a woven supporting sheet 22. The method of preserving the porosity of such sheets is described elsewhere in the specification.

Figure 6:
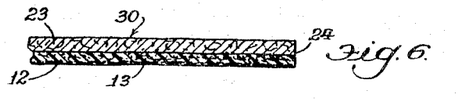
FIG. 6 depicts in cross-section a composite of natural leather and a porous leatherlike sheet produced by the method of this invention.

FIG. 6 is an illustration in cross-section of a composite 30 of natural leather 23 upon the flesh side 24 of which has been sprayed a permanently adhered layer of air permeable synthetic leatherlike material in accordance with this invention with typical cross-section 13 and back surface 12. A suitable primer for preparing the flesh side of the leather may be used if desired and an easily prepared primer formula is given in Example 4. In general, suitable primers may be prepared by diluting the coating solution with high boiling solvent. Only a thin, discontinuous primer coat should be applied.

Figure 7:
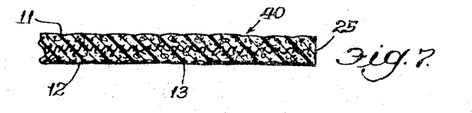
FIG. 7 depicts in cross-section a sheet, made by the process of this invention, reinforced with an embedded fabric.

FIG. 7 is an illustration of a composite 40 of material similar to that illustrated in FIG. 1 but with fabric 25 embedded. The fabric may be elastic in one or both directions or it may be non-elastic. It may be knitted, woven or nonwoven in construction.

Figure 8:
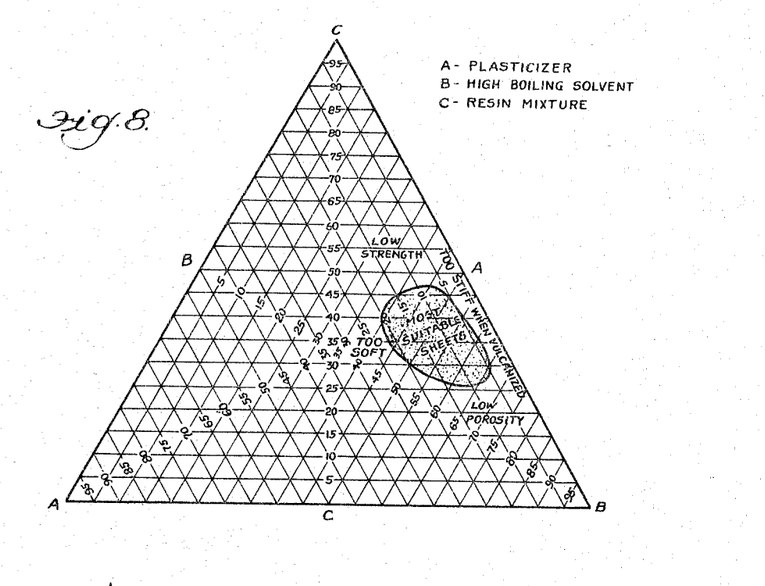
FIG. 8 is a triangular coordinate chart showing the proportions of vinyl resin-nitrile rubber mix, plasticizer and high boiling solvent which define the area of composition of the preferred sheets resembling leather made by the process.

FIG. 8, illustrating various solution formulations for producing leatherlike materials, is a triangular chart in which C is a mixture of vinyl resin and nitrate rubber and in which the latter is vulcanized after formation of the sheet. Substantially the same area of formulations producing most suitable sheets exists, however, where the sheets are not intended to be vulcanized and C is entirely vinyl resin.

Figure 9:
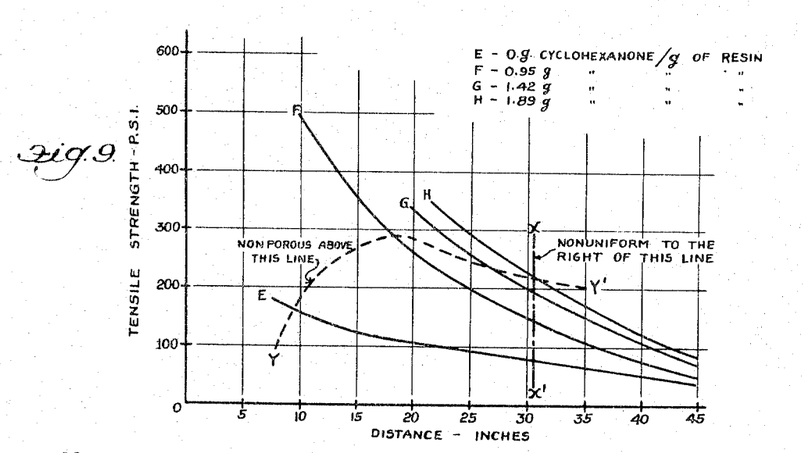
FIG. 9 is a graph showing the effect of nozzle to forming surface distance upon the tensil strength, uniformity and porosity before vulcanization of the unsupported products made by the invention containing vinyl resin and vulcanizable nitrile rubber when using various proportions of high boiling solvent.

FIG. 9 is a graphic representation showing the effect of nozzle distance from the forming surface upon the tensile strength of unsupported sheets made in accordance with the invention from the formula of Example 1 but with the amount of cyclohexanone varied as indicated. It is apparent from this graph that in the absence of high boiling solvent, the vinyl resin products are low in tensile strength. They are also low in abrasion resistance. From the chart it can be seen that optimum amounts of high boiling solvent are about .95 gram per gram of vinyl resin-nitrile rubber mix and the optimum nozzle distance from the forming surface is about 18 inches. These conditions give optimum characteristics for the porous sheets made with the particular formula. In general, the range of suitable percentages of high boiling solvents and the range of suitable nozzle distances from the forming surface are substantially similar regardless of the particular vinyl resin formula utilized although the optimum characteristics will vary somewhat with the formula used.

It is convenient, in producing products in accordance with the invention from normally solid polymers not utilized before, to use a device which might aptly be called a sample "stair." A convenient "stair" is one of about 8 inches width with risers and treads of about two inches width. Using such a device of eleven steps and placing the bottom riser 10 inches from the polymer solution orifice, one can obtain samples on the forming surfaces (risers) at two-inch orifice to target intervals from 10 to 30 inches by moving the spraying head while spraying up and down vertically about two feet. In general, using an air velocity of at least 400 feet per second and with the polymer to solvent ratio from about 1 to 3 to 1 to 8, one may spray the stair using a polymer solution to air ratio in the proper range and preferably about .26. In those cases where the sample formed on a particular riser does not conform to the forming surface sufficiently, that is those cases where the individual particles do not lose their form sufficiently to duplicate (except for small irregular pores) the riser surface, the substitution of a higher boiling solvent for part of the original solvent will correct the difficulty by producing greater plasticity in the particles. Adjustment between the two solvents will generally produce the optimum balance between tensile strength and abrasion resistance on the one hand and air permeability on the other.

In those cases where the air permeability of the original samples is less than that desired and some reduction in strength and abrasion resistance is tolerable some of the original solvent may be replaced by a lower boiling solvent. In general, it should be remembered, however, that while low boiling solvent dilutes the polymer solution permitting atomization, the larger part of such solvent leaves the particles before they strike the target and hence the excess not required for atomization is largely wasted if not recovered.

The preferred and strongest unsupported air permeable vinyl resin leatherlike sheets made in accordance with this invention, that is, those composed entirely of pneumatically sprayed synthetic material, are those which contain, in addition to the vinyl resin, some nitrile rubber which has been vulcanized after formation of the sheets. In these particular blends, any of the nitrile rubbers which are solid copolymers of butadiene and acrylonitrile are suitable. For sheets which are to be subsequently vulcanized, the proportion of nitrile rubber to vinyl resin is preferably in the range of 45 to 55% nitrile rubber to 55 to 45% vinyl resin, although some improvement in strength is achieved with as little as 10% nitrile rubber. Products in which the nitrile rubber proportion is greater than 70% are of limited utility, however, since they are inferior in many respects, including strength and air permeability.

The resin preferred in the vinyl resin blends suitable for the production of leatherlike sheets made in accordance with this invention whether vulcanized or unvulcanized is polyvinyl chloride although polyvinyl resins generally, such as polyvinyl acetate, polyvinyl carbazole, polyvinylidene chloride, copolymers of vinyl chloride and vinyl acetate and copolymers of vinylidene chloride with vinyl chloride and/or vinyl acetate, are suitable.

In the preferred vinyl resin blends suitable for leatherlike sheets made in accordance with this invention, the nitrile rubber acts as a plasticizer for the vinyl resin. Upon vulcanization, the plasticizing effect of the nitrile rubber is reduced, however, and usually in order to obtain optimum flexibility additional plasticizer is necessary. When the products are not to be vulcanized as when strength is not a primary consideration or whether strength is achieved by supporting materials, the nitrile rubber may be replaced entirely by other compatible plasticizers. Suitable plasticizers are adipates such as di-isooctyl adipate and di (2-ethylhexyl) adipate; phosphates such as tricresyl phosphate and trioctyl phosphate; phthalates such as dioctyl phthalate and di-isodecyl phthalate; various other esters such as diethylene glycol monolaurate, dimethyl sebacate, triethylene glycol dicaprylate, triethyl citrate; other plasticizers such as bis (dimethyl-benzyl) ether, o-nitrobiphenyl, methyl pentachlorostearate; resinous type plasticizers such as condensation products of sebacic acid and 1,2-propylene glycol, and alphamethylstyrene resins.

Where the plasticizer is a liquid it acts to promote atomization, deformation of particles on impact with the forming surface and particle coalescence.

For purposes of this invention, a high boiling solvent is one having a boiling point about 110° C. or more above the temperature of the high velocity air stream. With the air stream at convenient operating temperature i.e. in the range of 20-25° C., the high boiling solvent will normally be one whose boiling point is 130° C. or higher. Representative high boiling solvents for vinyl resins are the preferred solvent cyclohexanone, mesityl oxide, nitrobenzene and benzyl chloride. The ratio of high boiling solvent necessary to obtain the proper coalescence and degree of deformability at ambient temperatures is quite critical in vinyl resin solutions being in the range of .9 to 1.9 of the weight of the nitrile rubber-vinyl resin content. A lesser ratio of high boiling solvent results in a product face in which the particles are not sufficiently modified by impact with the forming surface but rather retain their attenuated form. The product formed by the use of such reduced high boiling solvent in addition to lacking an impact molded leatherlike grain surface appearance also is significantly inferior in abrasion resistance and tensile strength due to poor interparticle coalescence. Use of a greater ratio than 1.9 of high boiling solvent, on the other hand, results in a product of increased tensile strength but one whose porosity is reduced beyond the desirable minimum.

The amount of low boiling solvent used is less critical as explained hereafter but the best results are obtained when the ratio of low boiling solvent at ambient temperatures is in the range of 3 to 4 times the weight of the nitrile rubber-polyvinyl resin content.

Some normally solid polymers such as polyurethane retain low boiling solvent to such an extent that some coalescence of fibers and nodules may be achieved under the conditions without using any high boiling solvent. The amount of high boiling solvent is not critical with such materials but nevertheless the use of some high boiling solvent is desirable since such solvent increases the coalescence and enhances the strength and abrasion resistance without destroying the air perviousness.

After a given normally solid polymer or blend thereof is dissolved, the solution is pumped or otherwise conveyed to the orifice or nozzle from which it flows out into a turbulent high velocity air stream in such volume as to produce a polymer solution to air ratio of .18 to .55. The purpose of the high velocity air stream is to atomize and attenuate the viscous solution of polymer blend and forcibly propel it in the form of partially dried elongated filamentary particles against the forming surface. It is the essence of this invention that at the moment of impact the concentrated polymer particles, kept in softened condition by the retention of solvent and plasticizer, not only coalesce but are conformed minutely to the forming surface by impact therewith. Their degree of deformability is such, however, that under the conditions while they lose their form they do not completely lose their integrity; rather spaces between the modified and coalesced particles continue to exist rendering the sheet air permeable.

The distance of the forming surface from the polymer solution orifice is important being somewhat dependent upon the velocity of the high velocity air stream and upon the degree of deformability retained in the viscous polymer particles. Obviously, if the polymer solution travels in the air stream a greater distance, it must contain more solvent to begin with if the particles are to retain sufficient solvent to properly deform and coalesce when they strike the forming surface. When the distance is too great the nodules tend to disappear and nodules have a very necessary and desirable function in increasing the density, tensile strength and abrasion resistance. The fibers tend to be overly extended and thin if the distance is too great and this lack of concentrated mass coupled with the significant reduction of air velocity as the distance from the air stream orifice is increased causes the resulting products to lack sufficient density to be balanced. By that is meant that the products have reduced strength and abrasion resistance and too much porosity for most purposes. On the other hand, when the distance of the forming surface from the polymer solution orifice is too short, the density becomes too great and the tensile strength and abrasion resistance are increased while the air permeability is reduced below the desired minimum and the hand becomes less desirable.

It thus becomes apparent that there is a critical range of distances from the forming surface to the polymer solution orifice. I have found that this range is from 10 to about 30 inches with the optimum for vinyl resin products at about 18 inches and for polyurethane products at about 22 inches.

The degree of atomization as measured by the median particle size and the particle size distribution in the spray is also very important in the process of this invention. Median particle sizes above 500 microns do not produce suitable products. The preferred range of median particle size is from 15 microns to 50 microns with the larger drops predominantly smaller than 75 microns. Because of this relatively narrow range of suitable particle sizes, it is necessary to use pneumatic atomizers which by the movement of high pressure air past the liquid orifices are capable of producing the range of median particle sizes required. The main considerations in determining the degree of atomization are the viscosity of the polymer solution and the velocity of the high velocity air stream.

The methods disclosed in Canadian Patent No. 570,011 and U.S. Patent No. 2,810,426 differ radically from those of the present invention, a very significant difference having a direct bearing on the properties of the products produced being the ratio of polymer solution weight to atomizing gas weight. Disregarding the employment of secondary air streams which in the processes of this invention are not utilized and which would make the differences even more striking, the ratio (considering only the primary air stream) is in the range of .023 to .045 in the methods of the two mentioned patents. These small ratios produce structures which are light, weblike and extremely porous but lacking in optimum tensile strength and abrasion resistance. The methods of this invention, on the other hand, utilize wholly different, and 4 to 24 fold higher, ratios of polymer solution weight to atomizing gas weight, the minimum being .18, the preferred ratio being about .26 and the maximum being about .55. The products produced by this invention have a different structure and are much more dense than those of the subject patents. This is true not only because of the higher polymer solution to air ratios which result in greater concentration of particles but the particles, because of their shorter flight, strike the target or forming surface in high concentration. Moreover, due to their short flight, such particles are more compact and are moving at higher velocities when they strike the target. These conditions coupled with normally greater particle plasticity at the target results in considerable impact deformation of the particles with increased coalescence and interfitting thereof to form structures with excellent tensile strength, abrasion resistance and air permeability.

The products made in accordance with this invention generally have apparent densities in the range of about 35 to 75% of the density of ordinary cast films from the same solutions.

The high velocity air or gas stream has three functions in the process of this invention; it atomizes the polymer solution and attenuates the particles, it helps to drive off the low boiling solvents and it propels the particles forcibly against the forming surface thus causing the softened particles to conform minutely to the forming surface. I have found that the particles must have a velocity of at least 28 feet per second at the forming surface in order that proper conformity with the latter and adequate coalescence with the other particles to produce strong dense abrasion resistant structures may be achieved. There is a minimum air velocity which is necessary to break up the polymer solution into droplets and obviously this varies somewhat with the viscosity of the solution, a very viscous solution requiring a higher air velocity than one less viscous. I have found that with usual practical solution viscosities, a minimum air velocity at the nozzle of 400 feet per second is necessary in order to get the proper degree of atomization. Once the degree of atomization is satisfactory, decreasing the solution viscosity by the addition of low boiling solvent or increasing the air velocity normally will result in some reduction in drop size but further reduction in drop size produces products not sufficiently improved to justify the additional difficulties resulting from higher volumes of solvent vapors and/or increased air velocities. In general I find it expedient to use a gas velocity above the minimum which may be maintained without difficulty. I then adjust the amount of low boiling solvent to get proper atomization with a minimum of such solvent.

The forming surface in many applications of the invention is intended to become a permanent part of a composite including the sprayed material. In such cases the forming surface is merely the exposed side of the material selected to form one face of the composite.

In spraying onto knitted fabric or onto lace or other fabric where the sides are not identical, it is desirable to coat the smoother side if there is a choice although this is not imperative. Very frequently this is the back side such as is the case with jersey fabrics such as tricot.

In the production of elastic fabrics in accordance with this invention by spraying, two different spraying solutions are generally employed and preferably the two are sprayed at different distances from the fabric. One of these spraying solutions which acts as a pre-coat uses a slower drying solvent than the other. Normally, for the main coating a good solvent such as tetrahydrofuran or methyl ethyl ketone is used together with a low boiling thinner such as acetone in about a 1 to 1 ratio. For the pre-coat, however, the acetone would be replaced with methyl ethyl ketone which imparts its slower drying properties to the solution. Furthermore, while the finish coat is preferably applied at a distance of about 15 inches, the pre-coat is preferably applied at a distance of about 8 inches. However, while these distances are preferred under the conditions utilized wherein the normally solid polymer elastomer constitutes about one-tenth of the solution by weight and the solvents and thinners are in a ratio of about 1 to 1, change in the solvent ratio would indicate greater distances where the high boiling solvent is increased and the low boiling solvent decreased and vice versa. In general, for best results the pre-coat may be applied in a range 5 to 11 inches spray nozzle to fabric distance and the main coating may be applied in a range of 10–20 inches for the particular products. It is to be understood that in applying the main coating from a given solution, the distance from the spray nozzle to the fabric determines to a large extent the porosity and density of the fabric. Close spraying results in dense coatings which have restricted porosity. Denseness is associated with strength, elastic properties, abrasion resistance and tear resistance but the fabrics made in accordance with this invention are porous and the denseness of the coating must be regulated so as to preserve the porosity depending upon the thickness of the coating. The pre-coat should be applied so as not to form a continuous coating obviously. The amount found to be optimum is about 20 to 25 grams of dried pre-coat per square yard of fabric. The pre-coat should exist as tacky droplets at the time they strike the fabric so that the droplets will interlock with protruding fibers of the fabric. The nozzle delivery rate of the pre-coat solution preferably should be in the range of about 180 to 240 grams per minute while the main coating is applied preferably at a slower nozzle delivery rate of about 150 to 160 grams per minute. Preferably, the main coating is applied while the pre-coat is still tacky although this is not essential. Where the nozzles are in position along the travel of the fabric, the nozzles which spray onto the virgin fabric would obviously be the pre-coat nozzles and would be closer to the fabric as indicated. I have found it expedient also to adjust the pre-coat nozzles so that the solvent to air weight ratio is in the range of .5 to .6.

In most cases, however, the forming surface is used as a molding surface from which the adhered sprayed structure must be separated. Obviously the forming surface must be such as to permit such separation whether it be of hard rigid metal or of soft, flexible cotton felt. In general, materials capable of forming a flexible endless belt are preferred. The forming surface may be coated or otherwise treated with a release agent if necessary so that separation of the finished product from the forming surface may be more readily accomplished. Such coating of the forming surface, as with a silicone resin, for instance, may be required if the forming surface and the finished product have a tendency to strongly adhere.

An embossed appearance may be imparted to the leatherlike or other materials made in accordance with this invention by using a forming surface with the proper inverse pattern. Various grained leathers, cloths, coarse fibrous weavings of materials such as rattan, and the like may be reproduced faithfully by first preparing a forming surface having the inverse pattern. With most materials it is possible, for instance, to make an inverse pattern from unsaturated polyester resin dissolved in monostyrene (with a polymerization catalyst such as methyl ethyl ketone peroxide and with cobalt naphthalate as an accelerator) by spreading the thick solution onto some native material such as Panama straw whose surface is to be reproduced. After polymerization is complete, the inverse pattern may be stripped from the native material. Numerous other materials may be used for making forming surfaces with inverse patterns of natural and synthetic materials, as is well known.

The invention is not confined to the production of sheets alone or to garments which conform to and contact the body although such products may provide the most useful embodiments produced in accordance with the invention. Hollow shell-like forms of various three-dimensional objects may also be produced such as hats, bedroom slippers, raincoats and the like.

The leatherlike products made in accordance with this invention may vary considerably in appearance and hand. For instance, one may produce a product resembling soft glove leather, with a plump supple feel and with a hand characteristic of the finest flexible tanned chamois. On the other hand other products of this invention may have an appearance and feel more closely resembling parchment, especially where the thickness is in the same range as parchment.

The ratio of high boiling solvent, the distance from orifice to forming surface and the air or gas velocity limits given are those which are operative for vinyl resin at temperatures of 60°–100° F. Such temperatures, in general, are most convenient but one may operate by raising or lowering the temperature of either the gas, the polymer solution or the forming surface. The range of distances from orifice to forming surface is not greatly affected by departure from such temperatures but adjustment of the weight ratio of high boiling solvent to polymer blend may be necessary where temperatures outside this range are used.

It is possible to permanently combine one of the structures made in accordance with this invention with other porous materials by my method without sacrificing the porosity. This may be accomplished, for instance, by using porous material such as leather or cloth as the forming surface or the usual forming surface or belt may be covered with such materials. In some cases a better bond between such materials and the porous structures of this invention may be obtained by a very light discontinuous sprayed coating of a priming material. In the case of leather, I prefer to spray a dilute solution of the coating as a primer using a larger proportion of high boiling solvent and applying the thick coating preferably while the primer is still tacky although this latter step may be deferred until the primer is completely dry.

In addition to combining the sprayed structures made in accordance with this invention with preformed porous materials such as cloth and leather, two different sprayed-on layers of deposited material made in accordance with the invention may be combined. A layer deposited, for example, from a solution of urethane rubber may form the impact molded highly abrasion resistant surface with the back surface of sprayed vinyl resin.

The tensile strength of the leatherlike and other structures made in accordance with this invention may be increased and the appearance of the back surface altered by adhering a fibrous or non-fibrous porous backing material thereto, as is illustrated in FIG. 5. I have found that applying a small amount of solvent to dampen the backing material or alternately the porous deposited layer either by spraying, wiping, dipping or otherwise will make the latter sufficiently tacky to adhere it to most fibrous and non-fibrous porous backing materials without appreciably affecting the porosity. If the product is to be vulcanized, this step advantageously may be taken before vulcanization.

The tensile strengths of the structures made in accordance with this invention may also be increased by embedding therein strands or netlike fibrous layers which may be placed over a partially developed thickness of the deposited material and the spraying continued to develop the final thickness. This embedded material may be adhered (although usually placing is all that is needed) to the partially developed thickness by wiping or spraying either with solvent.

It is also possible to produce patterns in thickness and designs in color in the structures made in accordance with this invention by the use of stencils so that material is deposited only in a selected area or areas at one time, any remaining surface or thickness to be deposited being applied at a latter time.

The leatherlike products made in accordance with this invention may be more readily visualized by a comparison with leather.

So far as elongation is concerned, the unsupported vinyl resin-nitrile rubber blend products made in accordance with this invention have more elongation than leather in the same thickness or in an equivalent stiffness. The elongation of such products can be reduced, of course, where that might be desirable by the reduction of plasticizer or the application of various strands or fabrics to form composites of varying elongation.

The tensile strength of leatherlike products made in accordance with this invention when unsupported is about that of chamois leather although composites including various strands or fabrics may have any tensile strength imparted by the added material.

As measured by Joint Army-Navy Test P-127 Thwing-Albert cup method, the water vapor transmission rate of the unsupported leatherlike products made in accordance with this invention is normally greater than that of chamois leather or garment leather but may be reduced if desired by modifying the conditions as set forth elsewhere in the specification.

The air permeability of the unsupported leatherlike products made in accordance with this invention when measured by ASTM D726–58 using Gurley's densometer is greater than that of chamois leather. This property may also be varied by adjusting the conditions as set forth in the specification.

The abrasion resistance (as measured using the Taber Abraser) of the unsupported leatherlike products made in accordance with this invention is much superior to that of chamois leather and better than most garment leather. It compares favorably with various vinyl upholstery fabrics which are not permeable.

With regard to stiffness as measured on the Gurley R.D. Stiffness Tester, the leatherlike products made in accordance with this invention may be made to vary in stiffness from those less stiff than chamois to those more stiff than sole leather in similar thickness by adjustment of the plasticizer and the degree of vulcanization.

In the following examples, various trade names, used for simplification, are identified as follows:

A blend of 45 butadiene acrylonitrile copolymer and 55% polyvinyl chloride, sold under the trade name Geon Polyblend 503H, may be obtained from B. F. Goodrich Chemical Company, Cleveland, Ohio, as may be the butadiene acrylonitrile copolymer sold under the trade name Hycar 1012 and the poly(ester-urethane) elastomer sold in two molecular weights under the trade names Estane 5740x1 and Estane 5740x2.

A plasticizer, polyethylene glycol di-2 ethyl hexoate, sold under the trade name Flexol 4GO, is obtainable from Carbide and Carbon Chemical Company, New York, New York.

Conditioned rubber maker's sulphur, designated Spider sulphur, is obtainable from Olin Mathieson Chemical Corporation, New York, New York.

A rubber pigment "Watchung" red LD is obtainable from E. I. du Pont de Nemours, Wilmington, Delaware.

A viscous alkyd plasticizer, mixture of polyesters of a polybasic acid, is sold under the trade name Paraplex G53 by Rohm & Haas Company, Philadelphia, Pa., as is the polyester plasticizer sold under the trade name Paraplex G50.

Chromium oxide green is sold by Kohnstamm and Company, New York, New York.

A synthetic polymeric plasticizer of aromatic hydrocarbons is sold under the trade name Kenflex N by Kenrich Corporation, Maspeth, New York.

An antioxidant powder including phenyl betanapthylamine is sold under the trade name "Age Rite" by R. T. Vanderbilt Co., Inc., New York, New York, as is an antioxidant mixture of octylated diphenylamines sold under the trade name "Age Rite Stalite S."

Stabilizers sold under the designations Mark XI and Mark XX and containing barium-cadmium laurate and organic chelating agents, respectively, may be obtained from Argus Chemical Corp., Brooklyn, N.Y.

In all of the following examples the internal diameter of the polymer solution nozzle was .025 inch but this diameter is not at all critical so long as the pumping rate of the polymer solution may be varied to give adequate polymer solution to air ratios.

*Example 1*

Geon polyblend 503H _______________Parts by wt.___ 100
Acetone (low boiling solvent) _______________do____ 310

| | |
|---|---|
| Cyclohexanone (high boiling solvent) __Parts by wt__ | 100 |
| Flexol 4GO (plasticizer) ____do____ | 20 |
| Spider sulfur ____do____ | 2 |
| Mercaptobenzothiazole ____do____ | 2 |
| Stearic acid ____do____ | 1 |
| Magnesium oxide ____do____ | 12 |
| "Watchung" Red LD (pigment) ____do____ | 4 |
| Mark XI (stabilizer) ____do____ | 1 |
| Mark XX (stabilizer) ____do____ | 0.3 |
| Age Rite powder (antioxidant) ____do____ | 1 |

Spraying conditions:

| | |
|---|---|
| Distance target (forming surface) to nozzle ____inches__ | 18 |
| Pressure (air) ____p.s.i. gage__ | 55 |
| Polymer pumping rate ____lbs./hr__ | 4 |
| Orifice cross-sectional area (for air passage only) ____sq. in__ | .005 |
| Vulcanization conditions ____° F. for 30 min__ | 280 |

A 30 mil thick sheet resembling embossed leather was produced. The sheet which was flexible, but not too soft, had the following properties:

| | |
|---|---|
| Tensile strength ____p.s.i.__ | 490 |
| Elongation at break ____percent__ | 250 |
| Stiffness on Gurley stiffness tester ____mg__ | 26 |
| Porosity (air permeability) ____sec./100 cc__ | 3 |

Example 2

| | |
|---|---|
| Geon polyblend 503H ____Parts by wt__ | 100 |
| Acetone ____do____ | 270 |
| Cyclohexanone ____do____ | 140 |
| "Kenflex" N (plasticizer) ____do____ | 20 |
| Spider sulfur ____do____ | 2 |
| Benzothiazyl disulfide ____do____ | 2 |
| Stearic acid ____do____ | 1 |
| Magnesium oxide ____do____ | 12 |
| Chromium oxide, green (pigment) ____do____ | 4 |
| Mark XI (stabilizer) ____do____ | 1 |
| Mark XX ____do____ | 0.3 |
| Age Rite powder ____do____ | 1 |

Spraying conditions:

| | |
|---|---|
| Distance target to nozzle ____inches__ | 20 |
| Pressure (air) ____p.s.i. gage__ | 50 |
| Polymer pumping rate ____lbs./hr__ | 5 |
| Orifice cross-sectional area (for air) ____sq. in__ | .005 |
| Vulcanization conditions ____° F. for 20 min__ | 300 |

The product, a 40 mil thick sheet, was fairly stiff resembling tanned and dry leather and had the following properties:

| | |
|---|---|
| Tensile strength ____p.s.i.__ | 366 |
| Elongation at break ____percent__ | 107 |
| Stiffness on Gurley stiffness tester ____mg__ | 3540 |
| Porosity (air permeability) ____sec./100 cc__ | 4 |

Example 3

| | |
|---|---|
| Geon polyblend 503H ____Parts by wt__ | 80 |
| Hycar 1012 ____do____ | 20 |
| Acetone ____do____ | 230 |
| Cyclohexanone ____do____ | 150 |
| Paraplex G53 (plasticizer) ____do____ | 30 |
| Spider sulfur ____do____ | 3 |
| Mercaptabenzothiazole ____do____ | 3 |
| Stearic acid ____do____ | 1 |
| Titanium dioxide ____do____ | 5 |
| Carbon black ____do____ | 2 |
| Mark XI ____do____ | 1 |
| Mark XX ____do____ | 0.3 |
| Age Rite powder ____do____ | 1 |

Spraying conditions:

| | |
|---|---|
| Distance target to nozzle ____inches__ | 22 |
| Air pressure ____p.s.i. gage__ | 60 |
| Polymer pumping rate ____lbs./hr__ | 3 |
| Orifice cross-sectional area (for air passage only) ____sq. in__ | .01 |
| Vulcanization conditions ____° F. for 20 min__ | 300 |

A 20 mil thick, flexible, porous sheet was obtained with the following properties:

| | |
|---|---|
| Tensile strength ____p.s.i.__ | 169 |
| Elongation at break ____percent__ | 490 |
| Stiffness at Gurley stiffness tester ____mg__ | 51 |
| Porosity (air permeability) ____sec./100 cc__ | 30 |

Example 4

| | |
|---|---|
| Geon polyblend 503H ____Parts by wt__ | 100 |
| Acetone ____do____ | 200 |
| Cyclohexanone ____do____ | 250 |
| Mark XI ____do____ | 1 |
| Mark XX ____do____ | 0.3 |
| Age Rite powder ____do____ | 1 |

Spraying conditions:

| | |
|---|---|
| Distance ____inches__ | 18 |
| Pressure (air) ____p.s.i. gage__ | 60 |
| Pumping rate (polymer) ____lbs./hr__ | 4 |
| Orifice cross-sectional area (for air) ____sq. in__ | .005 |

This may be used for priming leather in order to obtain increased adhesion of the subsequently applied leatherlike coating.

Example 5

| | |
|---|---|
| Geon polyblend 503H ____Parts by wt__ | 100 |
| Acetone ____do____ | 310 |
| Cyclohexanone ____do____ | 100 |
| Flexol 4GO ____do____ | 20 |
| Mark XI ____do____ | 1 |
| Mark XX ____do____ | 0.3 |
| Age Rite powder ____do____ | 1 |

Spraying conditions:

| | |
|---|---|
| Distance target to nozzle ____inches__ | 18 |
| Pressure (air) ____p.s.i. gage__ | 55 |
| Polymer pumping rate ____lbs./hr__ | 4 |
| Orifice cross-sectional area (for air passage only) ____sq. in__ | .005 |

This material was sprayed onto a thin leather hide after a thin coating of Example 4 had been previously applied and while the latter was still somewhat tacky. An excellently anchored coating resulted with the composite having the characteristics of a thicker leather hide. The rubbery component of the composite was not vulcanized.

Example 6

The formula of Example 1 was sprayed onto a forming surface to a thickness of about 10 mils whereupon the sprayed surface was overlaid with a light nylon jersey-knit tricot fabric weighing 1.3 oz. per square yard and knitted of 15 denier yarns. The spraying continued until a composite of about 30 mils was produced with the nylon fabric completely embedded. The outward appearance of the product was unchanged but the tensile strength was increased to 925 p.s.i. in the wale direction and 945 p.s.i. in the course direction, while the porosity was reduced only slightly to 4.5 sec./100 cc. The stiffness in both course and wale directions of the fabric was 30 mg. The elongation at break was 130% in the wale direction and 56% in the course direction.

Example 7

The formula of Example 1 was used to produce a sprayed sheet of about 30 mils thickness. Before vulcanization the sprayed sheet was contacted with woven sheeting of 56/48 grey cloth weighing 3.35 oz. per square yard dampened with cyclohexanone and smoothed out in contact with the sprayed sheet with slight pressure. A permanent bond was formed after the sheet was vulcanized. The porosity of this particular product was about 9 sec./

100 cc. The stiffness was increased to 430 mg. The elongation at break was decreased to 13%. The tensile strength was increased to 1900 p.s.i.

*Example 8*

| | |
|---|---|
| Estane 5740x1 __________________Parts by wt__ | 100 |
| Tetrahydrofuran _______________________do____ | 700 |
| Acetone ______________________________do____ | 350 |
| Age Rite Stalite S ____________________do____ | 1 |
| Titanium dioxide ______________________do____ | 10 |

Spraying conditions:
| | | |
|---|---|---|
| Distance target to nozzle ___________inches__ | | 18 |
| Pressure (air) _____________________p.s.i.g__ | | 50 |
| Polymer pumping rate ____________lbs./hr__ | | 4.5 |
| Orifice cross-sectional area (for air passage only) ______________________sq. in__ | | .005 |

A 30 mil thick elastic sheet was prepared having a textile-like surface and excellent hand with the following properties:

| | |
|---|---|
| Tensile strength ____________________p.s.i__ | 820 |
| Elongation at break _______________percent__ | 570 |
| Stiffness on Gurley stiffness tester__________mg__ | 85 |
| Porosity (air permeability) _______sec./100 cc__ | 20 |

*Example 9*

| | |
|---|---|
| Estane 5740x1 __________________Parts by wt__ | 100 |
| Tetrahydrofuran _______________________do____ | 750 |
| Acetone ______________________________do____ | 300 |
| Antioxidant [1] _______________________do____ | 1 |
| Paraplex G50 _________________________do____ | 50 |

[1] 2,2′-methylene-bis (4-methyl-6-tertiary butyl phenol).

Spraying conditions:
| | | |
|---|---|---|
| Distance target to nozzle ___________inches__ | | 20 |
| Pressure __________________________p.s.i.g__ | | 55 |
| Polymer pumping rate ____________lbs./hr__ | | 4 |
| Orifice cross-sectional area (for air passage only) ______________________sq. in__ | | .005 |

A 25 mil thick elastic sheet was prepared.

| | |
|---|---|
| Tensile strength ____________________p.s.i__ | 340 |
| Elongation at break _______________percent__ | 380 |
| Stiffness on Gurley stiffness tester__________mg__ | 62 |
| Porosity (air permeability) _______sec./100 cc__ | 6 |

*Example 10*

| | |
|---|---|
| Estane 5740x2 __________________Parts by wt__ | 100 |
| Methyl ethyl ketone ___________________do____ | 550 |
| Acetone ______________________________do____ | 450 |
| Cyclohexanone _______________________do____ | 80 |
| Titanium dioxide ______________________do____ | 10 |
| Age Rite Stalite S ____________________do____ | 1 |

Spraying conditions:
| | |
|---|---|
| Distance target to nozzle ___________inches__ | 30 |
| Pressure __________________________p.s.i.g__ | 50 |
| Polymer pumping rate ____________lbs./hr__ | 4.2 |
| Orifice cross-sectional area ___________sq. in__ | .005 |

An elastic sheet 25 mils thick was prepared having the following properties:

| | |
|---|---|
| Tensile strength ____________________p.s.i__ | 1260 |
| Elongation at break _______________percent__ | 900 |
| Stiffness on Gurley stiffness tester__________mg__ | 446 |
| Porosity (air permeability) _______sec./100 cc__ | 10 |

*Example 11*

| | |
|---|---|
| Estane 5740x2 __________________Parts by wt__ | 100 |
| Methyl ethyl ketone ___________________do____ | 550 |
| Acetone ______________________________do____ | 500 |
| Titanium dioxide ______________________do____ | 10 |
| Age Rite Stalite S ____________________do____ | 1 |

Spraying conditions:
| | |
|---|---|
| Distance target to nozzle ___________inches__ | 30 |
| Pressure __________________________p.s.i.g__ | 55 |
| Polymer pumping rate ____________lbs./hr__ | 4 |
| Orifice cross-sectional area ___________sq. in__ | .005 |

An elastic sheet 25 mils thick was prepared having the following properties:

| | |
|---|---|
| Tensile strength ____________________p.s.i__ | 600 |
| Elongation at break _______________percent__ | 690 |
| Stiffness on Gurley stiffness tester__________mg__ | 40 |
| Porosity (air permeability) _______sec./100 cc__ | 2 |

*Example 12*

| | |
|---|---|
| Estane 5740x1 (poly (ester urethane) elastomer) parts by wt__ | 100 |
| Estane 5740x2 (poly (ester urethane) elastomer) B. F. Goodrich Chemical Co. Cleveland, Ohio parts by wt__ | 100 |
| Tetrahydrofuran _______________________do____ | 440 |
| Methyl ethyl ketone ___________________do____ | 400 |
| Acetone ______________________________do____ | 1100 |
| Titanox (titanium oxide) _______________do____ | 20 |
| Santovar A (2,5-di-(tert-amyl)hydroquinone, Monsanto Chemical Company, Akron 11, Ohio parts by wt__ | 4 |
| Tinuvin P—benzotriazole derivative ultra violet light absorber, Geigy Industrial Chemicals, Sodsley, New York ____________________parts by wt__ | 5 |

Spray conditions:
| | |
|---|---|
| Distance spray orifice to fabric _____inches__ | 14 |
| Pressure __________________________p.s.i.g__ | 60 |
| Solution rate per gun ____________g./min__ | 150 |

Stretch nylon fabric having a width of 64 inches, a thickness of 20 mils, and weighing 3⅓ ounces per running yard formed from S and Z twist torque yarns with the loop side uppermost moved past the spray guns at a rate sufficient to deposit 120 grams per square yard of dried sprayed polymer. Under the conditions of this experiment, this deposit of dried polymer concretion formed a suede-like layer 10 mils thick firmly bonded to the fabric. This fabric required an initial force of approximately four pounds per inch width to stretch it to 100 percent elongation comparing favorably with spandex power net fabric such as is presently used for girdles. When the rate of movement of the fabric was speeded up so that only 80 grams per square yard of dried sprayed polymer was deposited, a 6 mils thick coating was obtained. This lighter structure fabric required an initial force of approximately 1.5 pounds per inch width to stretch it to 100% elongation. The air permeability of each of these fabrics was less than 1 sec. per 100 cc. when measured by ASTM D726–58 using Gurley's densometer. The elongation was substantially that of the uncoated fabric.

*Example 13*

The experiment of Example 12 was repeated spraying the loop side of a nylon jersey tricot 32 inches in width formed of fine multifilament yarns permanently kinked and deformed and set in that condition such as Helanca type yarns. This fabric weighed about 2 ounches per running yard and had an elongation of 600% in the course direction and about 110% in the wale direction. The sprayed fabric produced had an air permeability of less than 1 second per 100 cc. when measured by ASTM D726-58. The hysteresis curves for the fabric with 10 mil dried sprayed polymer coatings and 6 mil dried sprayed polymer coatings were not substantially different from curves in Example 12. The elongation was substantially the same as that of the uncoated fabric.

I claim:
1. The method of forming an air permeable structure comprising moving a solution of not more than about 25% solids of normally solid polymer from an orifice into a turbulent gas stream having a velocity of at least 400 feet per second to form a pneumatic spray of thin filamentous portions of said solution, the weight of said solution as it leaves the orifice and enters the gas stream constituting at least 18% of the weight of said gas stream, partially drying said portions into tacky particles while propelling them by means of said gas stream to and forcibly against a forming surface disposed a distance of from about 10 to 30 inches from said orifice whereby said partially dried particles are deformed to minutely conform to the contours and surface characteristics of said forming surface and coalesce into a minutely interupted nonfibrous contact face adherent to said forming surface, and continuing the spraying to deposit additional filamentous particles upon those already deposited on said forming surface to form thereon a layer of usable thickness.

2. The method of claim 1 wherein normally solid polymer includes polyurethane rubber.

3. The method of claim 1 wherein prior to completion of said structure a strengthening web is placed against the exposed surface of said partially completed structure whereupon spraying is continued to complete the structure and embed the web.

4. The method of claim 1 wherein a strenghtening fabric is adhered to the exposed surface of said structure by means preserving at least some air permeability.

5. The method of claim 1 wherein the weight of said solution as it enters the gas stream is no greater than 55% by weight of said gas stream.

6. The method of claim 1 wherein said solution upon entry into said gas stream is atomized into droplets having a median size of from about 15 microns to 50 microns, with the larger droplets predominantly smaller than 75 microns, and then said droplets are extenuated into said filamentous portions while carried by the gas stream to said forming surface.

7. The method of claim 6 wherein the weight of said solution as it enters the gas stream is no greater than 55% by weight of said gas stream.

8. The method of claim 1 wherein said solution comprises a mixture of a vinyl polymer and butadiene-acrylonitrile polymer dissolved in a mixture of a high boiling solvent and a low boiling solvent in which the weight ratio of the high boiling solvent to total polymer in the solution is from 0.9 to 1.9.

References Cited

UNITED STATES PATENTS

| | | | |
|---|---|---|---|
| 1,773,089 | 8/1930 | Ayres | 117—4 |
| 2,126,824 | 8/1938 | Schneider | 156—305 X |
| 2,757,100 | 7/1956 | Simril | 117—7 |
| 2,810,426 | 10/1957 | Till et al. | 156—377 X |
| 2,950,752 | 8/1960 | Watson et al. | 156—371 X |

EARL M. BERGERT, *Primary Examiner.*

W. E. HOAG, *Assistant Examiner.*

UNITED STATES PATENT OFFICE
CERTIFICATE OF CORRECTION

Patent No. 3,325,322　　　　　　　　　　　　　　June 13, 1967

Donatas Satas

It is hereby certified that error appears in the above numbered patent requiring correction and that the said Letters Patent should read as corrected below.

Column 1, line 63, for "angle" read -- ankle --; column 5, line 1, for "whether" read -- where --; line 44, for "boling" read -- boiling --; column 13, line 67, for "446" read -- 44 --.

Signed and sealed this 18th day of June 1968.

(SEAL)
Attest:

Edward M. Fletcher, Jr.　　　　　　　　　　　　EDWARD J. BRENNER
Attesting Officer　　　　　　　　　　　　　　　Commissioner of Patents